United States Patent [19]

Takahashi et al.

[11] Patent Number: 5,306,558
[45] Date of Patent: Apr. 26, 1994

[54] DOUBLE-LAYERED RUBBER LAMINATE

[75] Inventors: Masaharu Takahashi; Tsutomu Nakamura, both of Gunma, Japan

[73] Assignee: Shin-Etsu Chemical Co., Ltd., Tokyo, Japan

[21] Appl. No.: 32,588

[22] Filed: Mar. 17, 1993

[30] Foreign Application Priority Data

Mar. 17, 1992 [JP] Japan ..................................... 4-91812

[51] Int. Cl.$^5$ .............................................. B32B 25/20
[52] U.S. Cl. ..................................... 428/331; 428/323; 428/447; 428/451
[58] Field of Search ................ 428/447, 451, 323, 331

[56] References Cited

U.S. PATENT DOCUMENTS 4,147,685  4/1979  Smith, Jr. ........................ 260/31.2 R

*Primary Examiner*—D. S. Nakarani
*Attorney, Agent, or Firm*—Millen, White, Zelano & Branigan

[57] ABSTRACT

An improved double-layered rubber laminate is proposed, which is an integral body consisting of a first layer of an organopolysiloxane-based rubber composition and a second layer of an acrylic rubber-based composition. When the acrylic rubber in the latter composition is not a conventional acrylic rubber but a copolymeric rubber of a (meth)acrylate ester monomer and an organosilicon monomer having, in a molecule, at least one silicon-bonded vinyl group and an ethylenically unsaturated group other than silicon-bonded vinyl groups, such as 3-methacryloxypropyl, very firm bonding can be obtained between the layers by the co-vulcanization of the laminated layers to exhibit very high resistance against delamination.

3 Claims, No Drawings

DOUBLE-LAYERED RUBBER LAMINATE

BACKGROUND OF THE INVENTION

The present invention relates to a double-layered rubber laminate or, more particularly, to a double-layered rubber laminate consisting of integrally laminated cured rubber layers of different types of rubber compositions.

Needless to say, various types of rubbers each have different chemical and physical properties and each of them has its own merits and demerits so that it is sometimes required that an article shaped from a cured rubber material have a laminate structure consisting of two layers of which one of the layers is formed from a rubber composition of a type different from that of the other layer when one of the surfaces of the rubber article is exposed to an ambient condition different from that to which the other surface of the article is exposed. In a rubber oil hose running within the engine room of an automobile, for example, it is essential that the inner surface of the hose in direct contact with an oil be highly oil-resistant while the outer surface of the hose, which receives the heat radiation from the high-temperature engine, be highly heat resistant. Further, laminated rubber bodies consisting of layers of, one, an electroconductive rubber and, the other, an insulating rubber are widely used in electronic instruments as a rubber contact. It is sometimes required that a coating layer of rubber provided on a substrate surface be laminate consisting of a top layer having high weatherability and an underlying layer which is highly susceptible to adhesive bonding to the substrate surface.

One of the problems common in these rubber laminates is that the bonding strength between the rubber layers of different types is not always very firm and reliable so that partial peeling or delamination of the layers is unavoidable even in the products as manufactured, resulting in a decreased yield of acceptable products, if not to mention the disadvantage in such a product that the serviceable life thereof is not long enough due to separation of the layers during use.

SUMMARY OF THE INVENTION

An object of the present invention accordingly is to provide a double-layered rubber laminate of a novel type which is free from the above mentioned problem of delamination into constituent layers.

Thus, the double-layered rubber laminate of the present invention is an integral sheet-formed body consisting of:

(A) a first layer of a rubber which is a cured organopolysiloxane composition comprising:
  (a) 100 parts by weight of an organopolysiloxane represented by the average unit formula $R_aSiO_{(4-a)/2}$, in which R is an unsubstituted or substituted monovalent hydrocarbon group and the subscript a is a positive number in the range from 1.95 to 2.05;
  (b) from 5 to 500 parts by weight of a finely divided silica powder; and
  (c) from 0.1 to 5 parts by weight of a first organic peroxide;
and
(B) a second layer of a rubber which is a cured acrylic rubber-based composition comprising:
  (d) 100 parts by weight of an acrylic rubber having, in a molecule, at least one organosilyl group of which at least one of the organic groups bonded to the silicon atom is a vinyl group;
  (e) from 10 to 200 parts by weight of a reinforcing filler; and
  (f) from 0.1 to 10 parts by weight of a second organic peroxide, of the first and the second rubber layers being integrally bonded to each other by curing a laminate consisting of a first layer of the organopolysiloxane composition before curing and a second layer of the acrylic rubber-based composition before curing.

DETAILED DESCRIPTION OF THE PREFERRED EMBODIMENTS

As is described above, the double-layered rubber laminate of the invention is an integral body consisting of a first cured rubber layer and a second cured rubber layer formed by curing a laminate of the respective rubber compositions before curing each having a unique formulation as defined above. By virtue of the unique combination of the rubber compositions forming the first and the second rubber layers, the inventive double-layered rubber laminate is free from the disadvantages of delamination between layers not only in the products as prepared but also after prolonged use under adverse ambient conditions.

The organopolysiloxane composition for forming the first cured rubber layer comprises the essential ingredients of the components (a), (b) and (c), of which the principal ingredient is the component (a). The organopolysiloxane as the component (a) is represented by the average unit formula $R_aSiO_{(4-a)/2}$, in which R is an unsubstituted or substituted monovalent hydrocarbon group and the subscript a is a positive number in the range from 1.95 to 2.05. The unsubstituted or substituted monovalent hydrocarbon group denoted by R in the formula is exemplified by alkyl groups such as methyl, ethyl, propyl and butyl groups, alkenyl groups such as vinyl, allyl and butenyl groups and aryl groups such as phenyl and tolyl groups as well as those substituted groups obtained by replacing a part or all of the hydrogen atoms in the above named hydrocarbon groups with substituents such as halogen atoms, cyano groups and the like exemplified by chloromethyl, 2-cyanoethyl and 3,3,3-trifluoropropyl groups. The subscript a in the average unit formula is a positive number in the range from 1.90 to 2.05. This limitation in the value of the subscript a means that the molecules of the organopolysiloxane have a substantially linear molecular structure although branches can be contained in a limited amount.

The terminal group at each molecular chain end of the organopolysiloxane molecules can be a triorganosilyl group including trimethyl silyl, dimethyl vinyl silyl, methyl phenyl vinyl silyl, methyl diphenyl silyl, methyl divinyl silyl and trivinyl silyl groups as well as a group having a silanolic hydroxy group bonded to the silicon atom in place of one of the hydrocarbon groups in the above named organic groups. The average degree of polymerization of the organopolysiloxane is not particularly limitative but it is preferable that the organopolysiloxane has a viscosity of at least 300 centistokes or, more preferably, at least 10,000 centistokes at 25° C.

The component (b) in the organopolysiloxane composition is a finely divided silica powder which is compounded with the component (a) with objects of reinforcement, increase of consistency, improvement of workability and volume extension so that it can be selected from known silica fillers according to the particular object including fumed and precipitated silica fillers, finely pulverized quartz powders, diatomaceous earth and the like. It is preferable that the silica powder as the component (b) has a specific surface area of at least 1 m$^2$/g from the standpoint of obtaining a reinforcing effect. The amount of this component (b) in the organopolysiloxane composition for the first rubber layer is in the range from 5 to 500 parts by weight or, preferably, from 10 to 300 parts by weight per 100 parts by weight of the organopolysiloxane as the component (a). When the amount of the component (b) is too small, the above mentioned objects expected in the formulation of this component cannot be fully achieved as a matter of course while, when the amount of the component (b) is too large, the workability of the composition in shaping of rubber layers is greatly decreased if not to mention that a reinforcing silica filler can never be compounded in such a large amount with the component (a).

The component (c) in the organopolysiloxane composition is an organic peroxide which serves as a curing agent of the composition by forming crosslinks between the molecules of the organopolysiloxane. Various kinds of organic peroxides can be used without particular limitations. Examples of preferable organic peroxides include benzoyl peroxide, monochlorobenzoyl peroxide, 2,4-dichlorobenzoyl peroxide, tert-butyl perbenzoate, dicumyl peroxide, 2,5-bis(tert-butylperoxy)-2,5-dimethyl hexane, 2,5-bis(tert-butylperoxy)-2,5-dimethyl hexyne and the like. The amount of the organic peroxide in the organopolysiloxane composition is in the range from 0.1 to 5 parts by weight per 100 parts by weight of the organopolysiloxane as the component (a). When the amount of the organic peroxide is too small, the composition cannot be fully cured even by heating to form the first rubber layer while, when the amount thereof is too large, the composition after curing would have poor rubbery elasticity in addition to the problem that foaming of the composition sometimes takes place in the composition by curing.

The organopolysiloxane composition to form the first rubber layer by curing can be prepared by uniformly blending the above described components (a), (b) and (c) each in a specified amount. The blending work of the components can be performed by using any conventional rubber processing machine such as Banbury mixers, pressurizable kneaders, two-roller mills and the like, if necessary, under heating. When the blending work of the components is performed at an elevated temperature, it is preferable that the components (a) and (b) are first uniformly blended at an elevated temperature and the blend is admixed with the component (c) only after cooling of the blend to a temperature at which thermal decomposition of the organic peroxide no longer takes place.

It is optional according to need that the organopolysiloxane composition is further admixed with various kinds of known additives conventionally used in organopolysiloxane-based rubber compositions including low molecular-weight organopolysiloxane fluids having an average degree of polymerization not exceeding 100 or a viscosity not exceeding 200 centistokes at 25° C., silanol group-containing organosilane compounds, alkoxy group-containing organosilane compounds and the like which serve as a dispersion aid or adhesion aid, iron oxide, ceric oxide, iron octoate, titanium dioxide and the like which serve as a heat-resistance improver, pigments for coloring, compounds of a metal such as platinum, palladium and the like which serve as a flame retardant, and so on each in a limited amount.

The acrylic rubber-based composition to form the second rubber layer to be integrated with the first rubber layer essentially comprises the above defined components (d), (e) and (f). The principal ingredient, i.e. component (d), is an acrylic copolymer having, in a molecule, at least one organosilyl group of which at least one of the organic groups bonded to the silicon atom is a vinyl group. Such a rubbery acrylic copolymer can be obtained by the copolymerization of an ester of (meth)acrylic acid represented by the general formula $CH_2=CR^1$—CO—O—$R^2$, in which $R^1$ is a hydrogen atom or a methyl group and $R^2$ is an alkyl or alkoxy-substituted alkyl group, and a vinyl-containing organosilicon compound having, besides the silicon-bonded vinyl groups, an ethylenically unsaturated group indirectly bonded to the silicon atom. Examples of the alkyl or alkoxy-substituted alkyl group as $R^2$ include methyl, ethyl, propyl, n-butyl, isobutyl, pentyl, hexyl, octyl, 2-ethylhexyl 2-methoxyethyl and 2-ethoxyethyl groups.

The vinyl-containing organosilicon compound to be copolymerized with the (meth)acrylate ester monomer described above to give the component (d) for the second layer (B) has, besides the silicon-bonded vinyl group or groups, an ethylenically unsaturated group, which pertains to the copolymerization with the (meth)acrylate ester monomer, other than the silicon-bonded vinyl in a molecule. Such an ethylenically unsaturated group is exemplified, for example, by acryloxymethyl group expressed by the structural formula $CH_2=CH$—CO—O—$CH_2$—, 3-methacryloxypropyl group expressed by the structural formula $CH_2=CMe$—CO—O—$C_3H_6$—, Me being a methyl group, vinylphenyl group expressed by the structural formula $CH_2=CH$—$C_6H_4$—, $C_6H_4$ being a phenylene group, 3-acrylamidopropyl group expressed by the structural formula $CH_2=CH$—CO—NH—$C_3H_6$— and the like. These ethylenically unsaturated groups have much higher copolymerizability with the (meth)acrylate ester monomer than the silicon-bonded vinyl groups so that the silicon-bonded vinyl groups are left intact in the copolymerization of the vinylsilyl-containing monomer with the (meth)acrylate ester monomer to provide crosslinking points when the copolymer is heated in the presence of an organic peroxide.

Examples of the vinylsilyl-containing monomer, which also should have another ethylenically unsaturated group copolymerizable with the (meth)acrylate ester monomer, include: acryloxymethyl vinyl dimethyl silane; 1-(3-methacryloxypropyl)-3-vinyl-1,1,3,3-tetramethyl disiloxane; 4-vinylphenyl vinyl dimethyl silane; 3-acrylamidopropyl vinyl dimethyl silane; a cyclic tetramer consisting of one 3-methacryloxypropyl methyl siloxane unit and three methyl vinyl siloxane units; a cyclic tetramer consisting of one 3-acryloxypropyl methyl siloxane unit and three methyl vinyl siloxane units and the like though not particularly limitative thereto.

The copolymerization ratio of the vinylsilyl-containing monomer and the (meth)acrylate ester monomer should be such that the amount of the vinylsilyl-containing monomer in the monomer mixture is in the range from 0.01 to 10% by weight or, preferably, from 0.3 to 5% by weight. When the amount thereof is too small, curing of the composition is incomplete not to exhibit high mechanical properties due to the deficiency in the crosslinking density while, when the amount thereof is too large, the composition after curing may have brittleness not to be suitable for practical use due to the excessively high crosslinking density.

The component (e) in the acrylic rubber-based composition for the second rubber layer (B) is a reinforcing filler which should have a specific surface area of, preferably, at least 30 m²/g. Examples of suitable reinforcing fillers include carbon blacks, fumed silica fillers, precipitated silica fillers, magnesium silicate, calcium silicate and the like. These fillers can optionally be rendered hydrophobic by the surface treatment with an organosilicon compound such as alkoxy silanes, hexamethyl disilazane and the like as well as with a higher fatty acid.

The amount of the reinforcing filler as the component (e) in the acrylic rubber-based composition should be in the range from 10 to 200 parts by weight or, preferably, from 20 to 100 parts by weight per 100 parts by weight of the acrylic rubber as the component (d). When the amount of the reinforcing filler is too small, the composition after curing cannot exhibit good mechanical properties due to the insufficient reinforcing effect while, when the amount of the reinforcing filler is too large, the composition after curing would be too hard with poor rubbery elasticity if not to mention the extreme difficulty encountered in the compounding work of a so large amount of the filler with the rubbery component.

The component (f) if the acrylic rubber-based composition is an organic peroxide which is exemplified by benzoyl peroxide, 4-chlorobenzoyl peroxide, 2-chlorobenzoyl peroxide, dichlorobenzoyl peroxide, dicumyl peroxide, 2,5-dimethyl-2,5-di(tert-butylperoxy) hexane, di-tert-butyl peroxide, tert-butyl perbenzoate, 1,1-di(-tert-butylperoxy)-3,3,5-trimethyl cyclohexane, 1,3-bis(-tert-butylperoxy isopropyl) benzene, tert-butylperoxy isopropyl carbonate and the like though not particularly limitative thereto. These organic peroxides can be used either singly or as a combination of two kinds or more according to need. The organic peroxide as the component (f) in the acrylic rubber-based composition can be the same as or different from the organic peroxide as the component (c) in the organopolysiloxane-based composition.

The amount of the organic peroxide as the component (f) in the acrylic rubber-based composition is in the range from 0.1 to 10 parts by weight per 100 parts by weight of the acrylic rubbery polymer as the component (d). When the amount thereof is too small, the rubber composition cannot be fully cured as a matter of course while, when the amount thereof is too large, the rubber composition after curing would be somewhat too brittle to exhibit good rubbery elasticity.

It is of course optional that the acrylic rubber-based composition is admixed with various kinds of known additives conventionally used in rubber compositions including non-reinforcing fillers such as titanium dioxide, aluminum oxide, zinc oxide, iron oxide, graphite powders, calcium carbonate, mica flakes, clay, talc, quartz powders, diatomaceous earth, baryta and aluminum hydroxide as well as organic fillers, adhesion aids such as carbon-functional organosilane compounds, antioxidants, aging retarders, flame retardants, coloring agents, blowing agents, mold-release agents, ultraviolet absorbers, dispersion aids, lubricants such as higher fatty acids, e.g., stearic acid, lauric acid and the like as well as various kinds of spherical particles, and so on each in a limited amount according to need.

It is further optional that the acrylic rubber-based composition is compounded with an organopolysiloxane so that an improvement can be obtained in the compatibility of the acrylic rubber-based layer (B) to the silicone rubber-based layer (A). The organopolysiloxane can be the same one as that used as the component (a) used in the organopolysiloxane-based rubber composition or can be the organopolysiloxane-based rubber composition for the first rubber layer. The amount of such an organopolysiloxane is limited not to exceed 30 parts by weight per 100 parts by weight of the acrylic rubber-based composition consisting of the components (d), (e) and (f). Improvement in the compatibility between two rubber layers can also be obtained by compounding the organopolysiloxane-based composition for the first rubber layer (A) with a limited amount of the component (d).

The double-layered rubber laminate of the invention is a laminate of the two cured rubber layers, one, shaped from the organopolysiloxane-based rubber composition and, the other, shaped from the acrylic rubber-based composition described above. Such a laminate can be prepared either by laminating two different separately prepared rubber sheets before curing one on the other followed by curing integrally under compression or, alternatively, by the method of co-extrusion of the two different rubber compositions into an integral uncured rubber laminate which is subsequently subjected to a curing or vulcanization treatment.

Although it is an advantageous way in order to improve the bonding strength between the two layers that each of the two types of the rubber compositions be admixed with a finely divided reinforcing silica filler having a specific surface area of at least 5 m²/g, the amount of such a reinforcing silica filler should be limited not to exceed 10 parts by weight per 100 parts by weight of the rubbery polymeric ingredient in the respective compositions. When the amount thereof is too large, the rubbery properties, such as hardness and ultimate elongation, of the layers after curing would be greatly influenced. In particular, it is preferable that formulation of such a reinforcing silica filler be limited to the acrylic rubber-based composition only in view of the influences on the roll-milling workability of the uncured composition and the mechanical properties of the laminated product when the organopolysiloxane-based composition is admixed with such a reinforcing silica filler.

The process of molding and vulcanization of the inventive laminated product can be performed according to a known molding method including compression molding, extrusion molding, calendering, transfer molding, injection molding and the like depending on the particular products desired, which can be in the forms of laminated sheets, pipes or tubes having a double-layered wall, gaskets or packings, articles of various irregular forms and so on, followed by curing or vulcanization.

The process of curing or vulcanization is also known in the prior art. Namely, the uncured laminate is heated at a temperature higher than the decomposition temperature of the organic peroxide contained in the respective rubber compositions. For example, vulcanization of the layers is complete by heating them at a temperature of 100° to 500° C. for 5 seconds to 10 minutes, if necessary, followed by a post-vulcanization treatment of heating at 150° to 250° C. for 30 minutes to 24 hours.

The rubber laminate of the invention prepared in the above described manner is highly resistant against delamination due to the very high bonding strength between the layers so that advantages are obtained not only in the production line with respect to an increase in the yield of acceptable products as well as improved appearance of the products but also in the users' side with respect to the greatly improved durability of the products without the trouble of delamination into layers during use. Incidentally, an additional advantage is obtained when the inventive rubber laminate is used as a gasket for building materials or, in particular, pre-cast concrete bodies because very firm adhesive bonding between the acrylic rubber-based surface of the gasket and the pre-cast concrete body can be obtained easily by using a conventional polychloroprene rubber-based adhesive.

In the following, the laminated rubber article of the invention is described in more detail by way of examples, in which the term of "parts" always refers to "parts by weight".

EXAMPLE 1

An organopolysiloxane-based composition, referred to as the base compound I hereinbelow, was prepared by compounding, on a two-roller mill, 100 parts of a gum-like diorganopolysiloxane of a linear molecular structure having an average degree of polymerization of about 8000 as consisting of 99.825% by moles of the dimethylsiloxane units of the unit formula $(CH_3)_2SiO$, 0.15% by moles of the methylvinylsiloxane units of the unit formula $(CH_3)(CH_2=CH)SiO$, dimethylvinylsiloxane units of the unit formula $(CH_3)_2(CH_2=CH)SiO_{\frac{1}{2}}$ with 3 parts of diphenylsilane diol and 4 parts of a low-molecular dimethylpolysiloxane terminated by silanol groups at the molecular chain ends having a degree of polymerization of 10 each as a dispersing aid and 40 parts of a fumed silica filler having a specific surface area of about 200 m²/g (Aerosil 200, a product by Nippon Aerosil Co.) to give a blend which was heated at 140° C. for 4 hours followed by cooling to room temperature and further admixture of 1 part of dicumyl peroxide as a curing agent.

Separately, an acrylic rubber-based composition, referred to as the base compound II hereinbelow, was prepared by uniformly compounding, in a pressurizable kneader, 100 parts of an acrylic rubber having vinylsilyl groups (RV-2540, a product by Nissin Chemical Industry Co.) with 1 part of stearic acid, 2 parts of a 4,4'-substituted diphenylamine compound (Nauguard 445, a product by Uniroyal Co.) and 40 parts of a HAF carbon black to give a blend which was further kneaded on a two-roller mill with admixture of 0.9 part of a silicone oil-based paste containing 65% by weight of 1,1-bis(-tert-butylperoxy)-3,3,5-trimethyl cyclohexane (C-13, a product by Shin-Etsu Chemical Co.) and 1.8 parts of a vulcanization accelerator (Sumifine BM, a product by Sumitomo Chemical Co.).

Each of the base compounds I and II was sheeted by extrusion molding into a 2 mm thick sheet and 150 mm by 150 mm wide pieces of the respective sheets were laid one on the other and integrally vulcanized by heating at 160° C. for 10 minutes under a pressure of 100 kgf/cm² to give a laminated rubber sheet.

The thus prepared laminate was cut into test pieces in the form of a strip of 20 mm width, of which the resistance against forcible delamination was measured by pulling apart the layers in a 180° direction to find that rupture took place at a pulling force of 3.0 kgf/cm always by the cohesive failure within the layer of the organopolysiloxane-based rubber.

EXAMPLE 2

Another organopolysiloxane-based composition, referred to as the base compound III hereinbelow, was prepared in the same manner and in the same formulation as in the base compound I in Example 1 except that the curing agent, C-13, was replaced with 1.5 parts of another silicone oil-based paste containing 50% by weight of 2,4-dichlorobenzoyl peroxide and 2.5 parts of azobisisobutyronitrile were additionally admixed as a blowing agent. Separately, another acrylic rubber-based composition, referred to as the base compound IV hereinbelow, was prepared in the same manner and in the same formulation as in the base compound II in Example 1 excepting further admixture of 2.0 parts of azodicarbonamide as a blowing agent.

The base compounds III and IV were each sheeted by extrusion molding into a sheet of 2 mm thickness and 5 mm by 10 mm wide pieces of the respective sheets were laid one on the other with manual pressing followed by hot-air vulcanization under normal pressure at 200° C. for 15 minutes to give a foamed rubber laminate, which was subjected to the test of forcible delamination by making an incision along the interface of the layers with a knife edge always to cause rupture only by the cohesive failure within the foamed rubber layer of the base compound III.

What is claimed is:

1. A double-layered rubber laminate which is an integral body consisting of
    (A) a first layer of a rubber which is a cured organopolysiloxane composition comprising
        (a) 100 parts by weight of an organopolysiloxane represented by the average unit formula $R_aSiO_{(4-a)/2}$, in which R is an unsubstituted or substituted monovalent hydrocarbon group and the subscript a is a positive number in the range from 1.95 to 2.05;
        (b) from 5 to 500 parts by weight of a finely divided silica powder having a specific surface area of at least 1 m²/g; and
        (c) from 0.1 to 5 parts by weight of a first organic peroxide;
    and
    (B) a second layer of a rubber which is a cured acrylic rubber-based composition comprising
        (d) 100 parts by weight of an acrylic rubber comprising a copolymer of from 99.99% to 90% by weight of the (meth)acrylate ester monomer and from 0.01% to 10% by weight of a vinyl silyl-containing monomer which has another ethylenically unsaturated group indirectly bonded to the silicon atom;
        (e) from 10 to 200 parts by weight of a reinforcing filler having a specific surface area of at least 30 m²/g; and
        (f) from 0.1 to 10 parts by weight of a second organic peroxide,
        the first and second rubber layers being integrally bonded to each other by curing a laminate consisting of a first layer of the organopolysiloxane composition before curing and a second layer of the acrylic rubber-based composition before curing.

2. The double-layered rubber laminate as claimed in claim 1 in which the acrylic rubber as the component (d) is a copolymer of a (meth)acrylate ester monomer represented by the general formula $CH_2=CR^1-CO-O-R^2$, in which $R^1$ is a hydrogen atom or a methyl group and $R^2$ is an alkyl or alkoxy-substituted alkyl group.

3. The double-layered rubber laminate as claimed in claim 2 in which the ethylenically unsaturated group indirectly bonded to the silicon atom is selected from the group consisting of acryloxymethyl group, 3-methacryloxypropyl group, vinylphenyl group and 3-acrylamidopropyl group.

* * * * *